United States Patent
Lin et al.

(10) Patent No.: US 7,086,753 B2
(45) Date of Patent: Aug. 8, 2006

(54) DIRECT-LIGHT ILLUMINATING UNIT OF LCD MODULE WITH LIGHT SHADE DEVICES

(75) Inventors: Chih-Hsiung Lin, Changhua (TW); Hsin-Yi Lai, Taichung (TW); John Chungteh Pan, Taichung (TW)

(73) Assignee: Forhouse Corporation, Taichung Hsien (TW)

( * ) Notice: Subject to any disclaimer, the term of this patent is extended or adjusted under 35 U.S.C. 154(b) by 177 days.

(21) Appl. No.: 10/837,705

(22) Filed: May 4, 2004

(65) Prior Publication Data

US 2005/0248938 A1    Nov. 10, 2005

(51) Int. Cl.
*G02F 1/1335* (2006.01)
*F21V 1/00* (2006.01)
*F21S 4/00* (2006.01)

(52) U.S. Cl. ............ 362/225; 362/97; 362/224; 362/351; 362/360; 349/70

(58) Field of Classification Search ........ 362/225, 362/222, 224, 613, 559, 561, 97, 614, 632–634, 362/351, 360; 349/70
See application file for complete search history.

(56) References Cited

U.S. PATENT DOCUMENTS

| 5,089,943 A * | 2/1992 | Wolfelschneider .......... 362/216 |
| 6,867,829 B1 * | 3/2005 | Chiou ......................... 349/66 |
| 2005/0047174 A1 * | 3/2005 | Pan et al. .................. 362/561 |

* cited by examiner

*Primary Examiner*—Alan Cariaso
*Assistant Examiner*—Leah S Lovell
(74) *Attorney, Agent, or Firm*—Birch, Stewart, Kolasch & Birch, LLP

(57) ABSTRACT

A direct-light illuminating unit has a frame on which a plurality of U-shaped lamps and a plurality of light shade devices are mounted. The frame has a window region and a margin region. The lamps each have two straight portions and a connection portion. The lamps have the straight portions and the connection portions arranged in the window region of the frame. The light shade device has a top mask extended over the connection portions of the lamps respectively. The top masks have a predetermined transparency to shade a part of the light provided from the connection portions of the lamps respectively.

13 Claims, 7 Drawing Sheets

DIRECT-LIGHT ILLUMINATING UNIT OF LCD MODULE WITH LIGHT SHADE DEVICES

BACKGROUND OF THE INVENTION

1. Field of the Invention

The present invention relates generally to a liquid crystal display (LCD) module, and more particularly to a direct-light illuminating unit for the LCD module, which has light shade to shade the lamps at where has a greater luminance.

2. Description of the Related Art

Liquid crystal displays (LCDs) have been applied to computer monitors, video devices, consumer electronics and the like. A conventional LCD module is mainly composed of a liquid crystal panel and an illuminating backlight unit. The backlight unit provides illumination to the liquid crystal panel so that the panel can show predetermined images.

FIG. 1 shows a conventional direct-light illuminating unit 100 having a frame 102 on which three U-shaped lamps 106 and a diffuser plate 106 are mounted. Each lamp 104 has two straight portions 108 and a connection portion 110 connected to ends of the straight portions 108. The frame 102 has a window region 112 at a center thereof and a margin region 114 around the window region 112. The straight portions 108 of the lamps 104 are arranged in window region 112 and the connection portions 110 thereof are arranged in the margin region 114.

While the lamps 104 are turned on, the connection portions 110 provide much greater luminance than straight portions 108. That causes the diffuser plate 106 hard to diffuse the light provided from the lamps 11 uniformly. The illuminating unit 100 provides the connection portions 110 of the lamps 104 out of the window region 112, which means, only the straight portions 108 of the lamps 104 provide the light to the diffuser plate 106 and that will make the diffuser plate 106 providing a uniform light to a liquid crystal panel (not shown). The direct-light illuminating unit 100 fixes the problem of the U-shaped lamps hard to be diffused, but it gives a smaller window region and a greater margin region.

In addition, the direct-light illuminating unit 100 has the light generated from the connection portions 110 of the lamps 104 waste, so that it has to provide longer lamps 104 to provide a sufficient luminance.

SUMMARY OF THE INVENTION

The primary objective of the present invention is to provide a direct-light illuminating unit (backlight unit) for LCD module, which the straight portions and the connection portions of the lamps are arranged in the window region of the frame and the lamps still provide a uniform light.

The secondary objective of the present invention is to provide a direct-light illuminating unit (backlight unit) for LCD module, which has a greater window region and a smaller margin region.

According to the objective of the present invention, a direct-light illuminating unit comprises a frame on which at least a lamp and at least a light shade device are mounted. The frame has a window region and a margin region. The lamp has at least two straight portions and at least a connection portion and both of the straight portions and the connection portion of the lamp are arranged in the window region of the frame. The light shade device has a top mask, which has a predetermined transparency to shade at least a part of the light provided from the connection portion of the lamp.

DETAILED DESCRIPTION OF THE INVENTION

Figure 1:
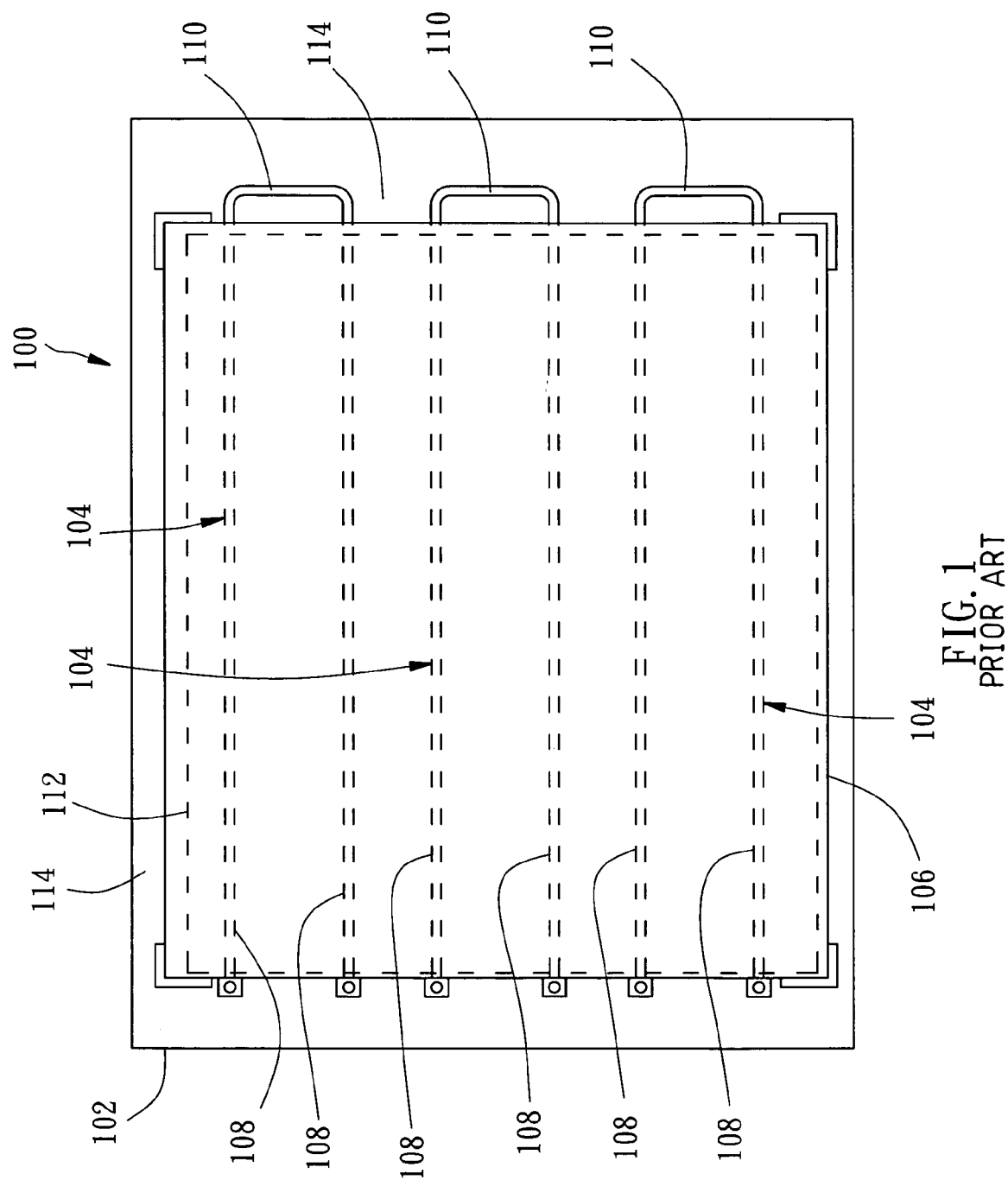
FIG. 1 is a top view of a conventional direct-light illuminating unit.
Figure 2:
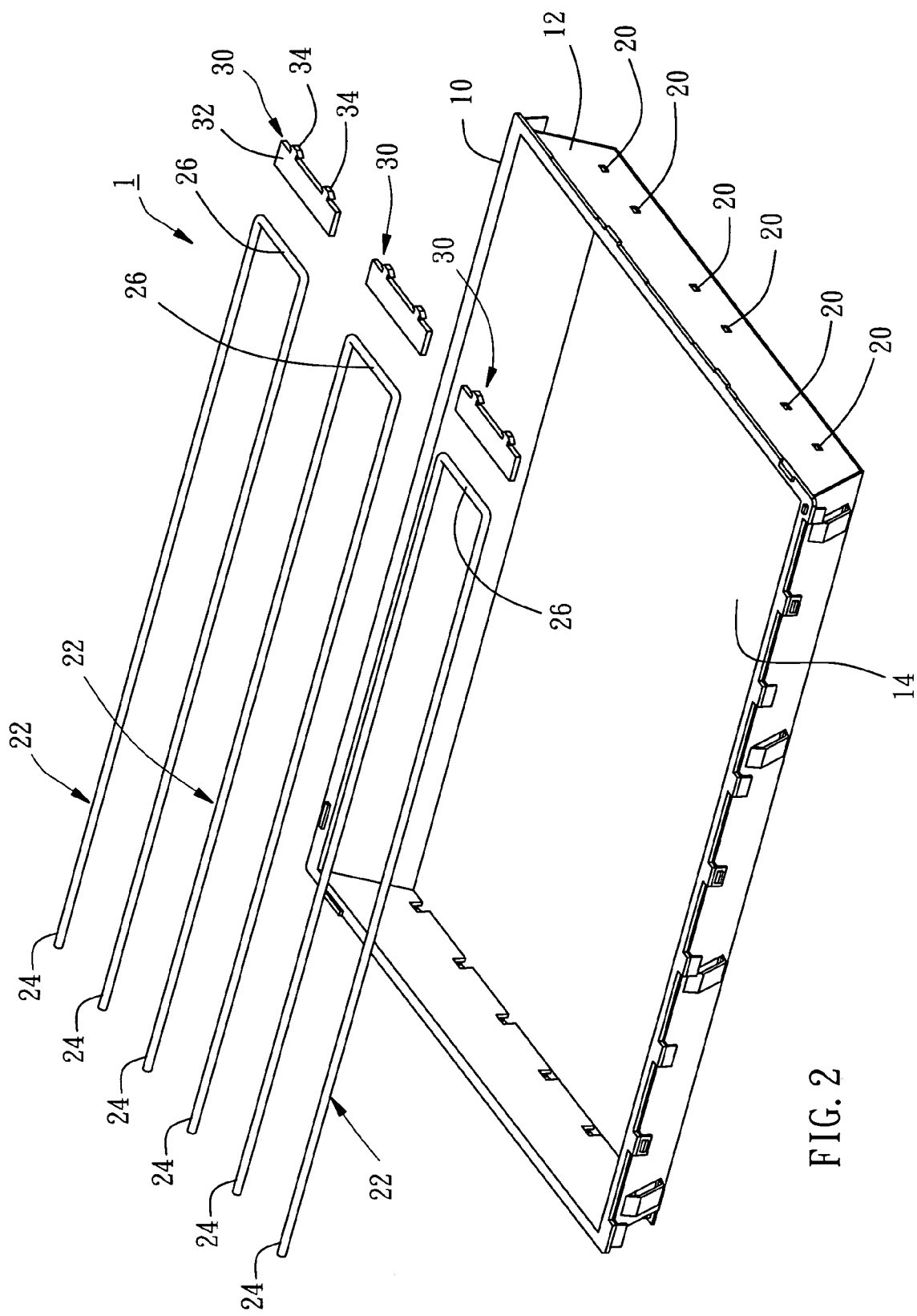
FIG. 2 is an exploded view of a first preferred embodiment of the present invention.
Figure 3:
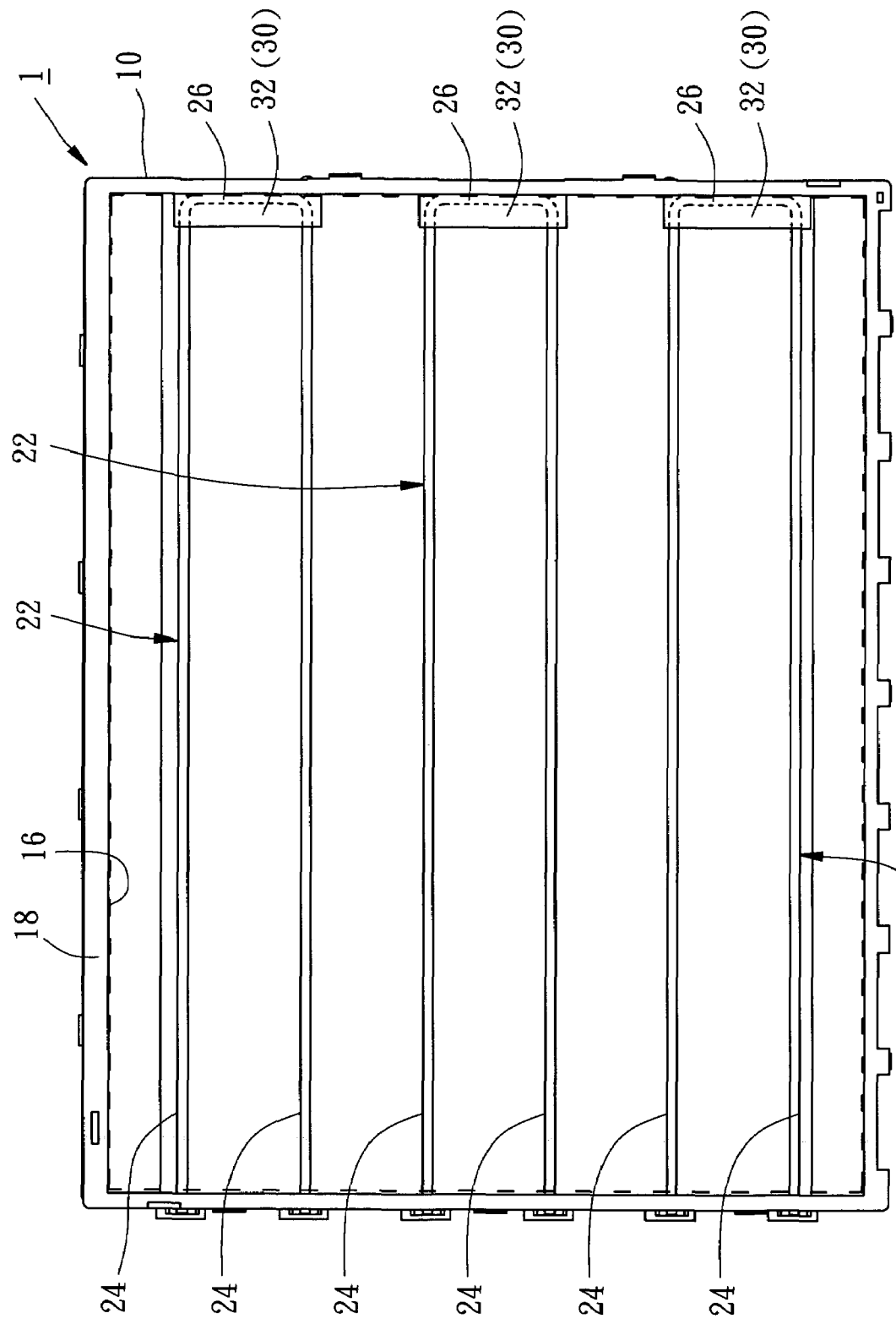
FIG. 3 is a top view of the first preferred embodiment of the present invention.

As shown in FIG. 2, a direct-light illuminating backlight unit 1 of the first preferred embodiment of the present invention provides for a LCD module comprises:

A frame 10 has a rectangular sidewall 12 and a bottom plate 14. The frame 10 has a window region 16 at a center thereof and a margin region 18 around the window region 16.

Three lamps 22, each of which is bent from a straight lamp into a U-shaped lamp, have two parallel straight portions 24 and a connection portion 26 connected to ends of the straight portions 24. The lamps are provided with an electrode 28 at each free end of the straight portions 24 respectively. The electrodes 28 are electrically connected to a power (not shown). The frame 10 is provided with a diffuser plate (not shown) thereon to cover the lamps 22 and the window region 16.

Three light shade devices 30 each have a top mask 32 and two connectors 34. The light shade devices 30 are mounted on an interior side of the sidewall 12 of the frame 10 with which the connectors 34 thereof are inserted into slots 20 on the sidewall 12 and the top masks 32 thereof are extended over the connection portions 26 of the lamps 22 respectively.

The top masks 32 of the light shade devices 30 are made of a semitransparent material to shade a part of the light provided from the connection portions 26 of the lamps 22 where have greater luminance. As a result, the luminance at where adjacent to the connection portions 26 is reduced and is substantially equal to the luminance at where adjacent to the straight portions 24. The U-shaped lamps 22, therefore, have the straight portions 24 (except for the electrodes 28 on the ends of the straight portions 24) and the connection portions 26 arranged in the window portion 16 of the illuminating backlight unit 1. To compare with the conventional illuminating backlight unit 100, the illuminating backlight unit 1 of the present invention has a greater window region 16 and a smaller margin region 18.

The top mask 32 of the light shade device 30 is to shade the light provided from the connection portion 26 of the lamp 22, so that if the top mask 32 has a less transparency, much light provided from the connection portion 26 is shaded. The transparency of the top mask 32 might be opaque, which is designated by the designer. The top mask 32 might have a specific color, which it also is to average the luminance of the straight portion 24 and the connection portion 26.

Figure 4:
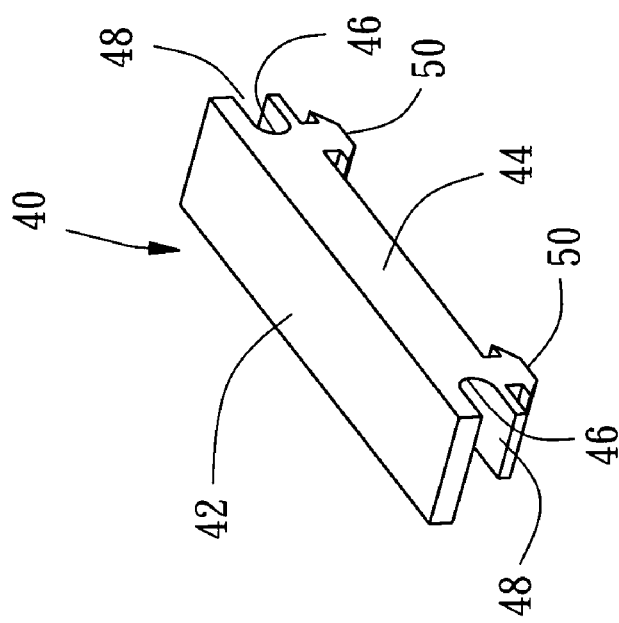
FIG. 4 is a perspective view of the first preferred embodiment of the present invention.

As shown in FIG. 4, a light shade device 40 of an illuminating backlight unit 2 of the second preferred embodiment of the present invention has a top mask 42, a front mask 44 on which two holes 46 and two gaps 48 are provided and two connectors 50 at a bottom of the front mask 44.

Figure 7:
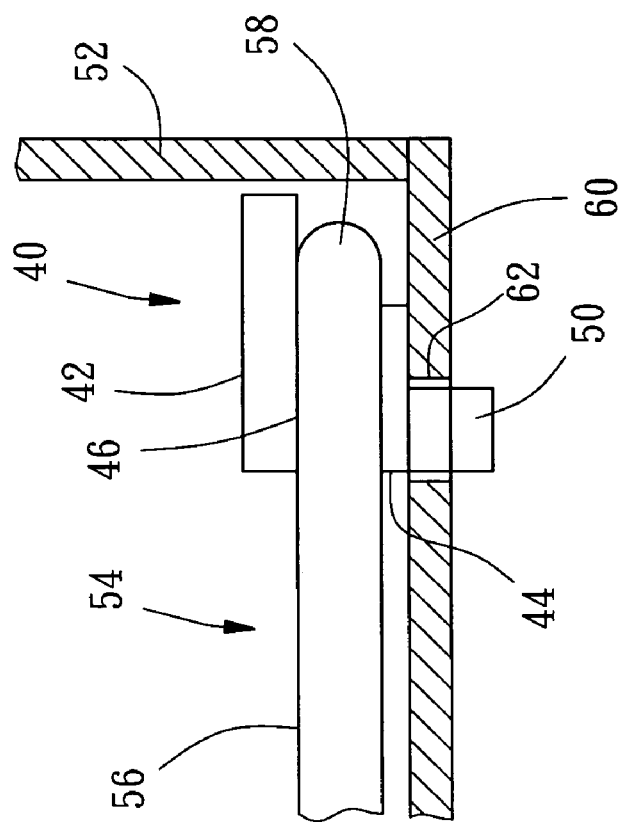
FIG. 7 is a sectional view of the light shade device and the lamp of the second preferred embodiment of the present invention.
Figure 5:
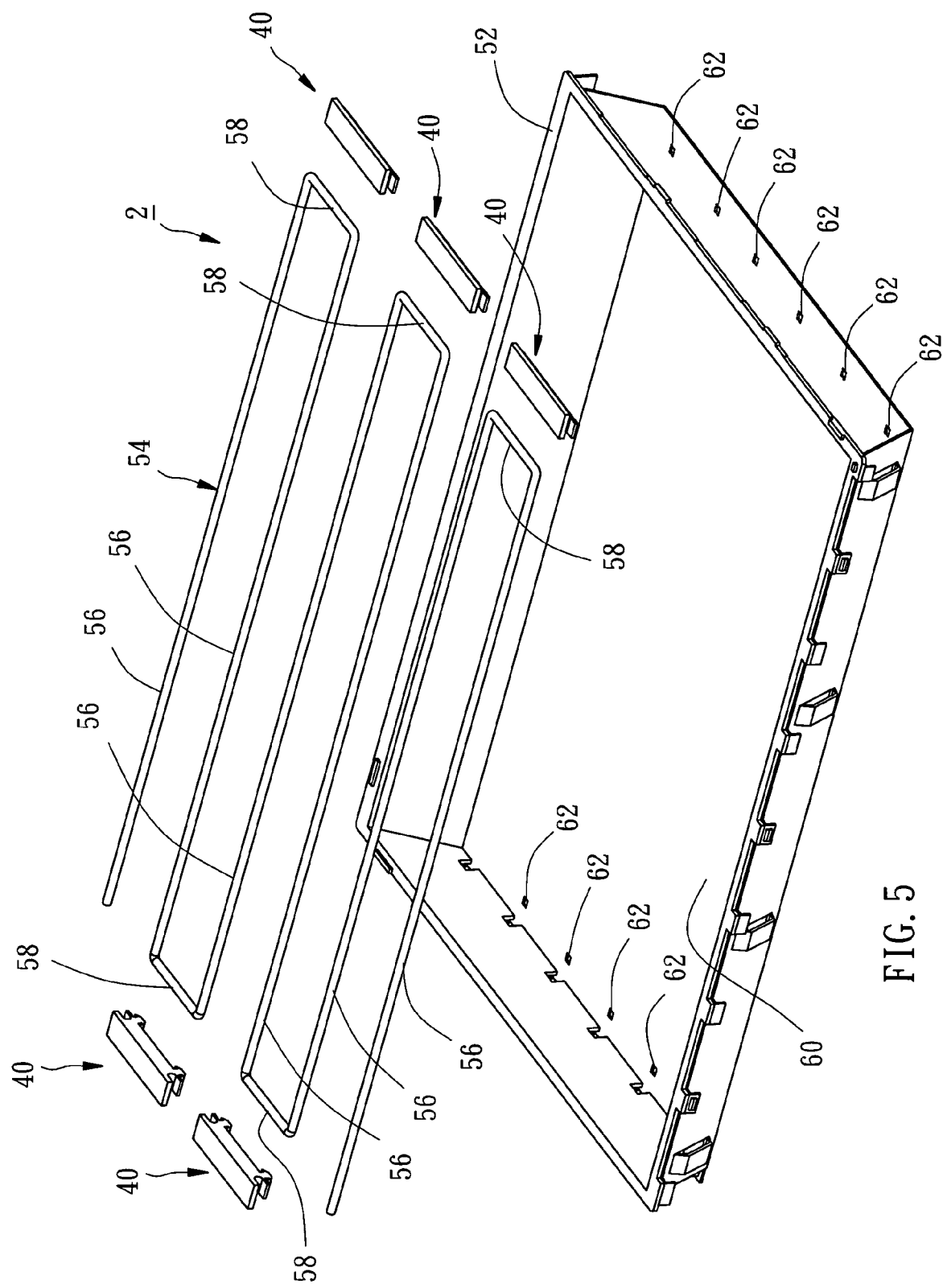
FIG. 5 is an exploded view of a second preferred embodiment of the present invention.
Figure 6:
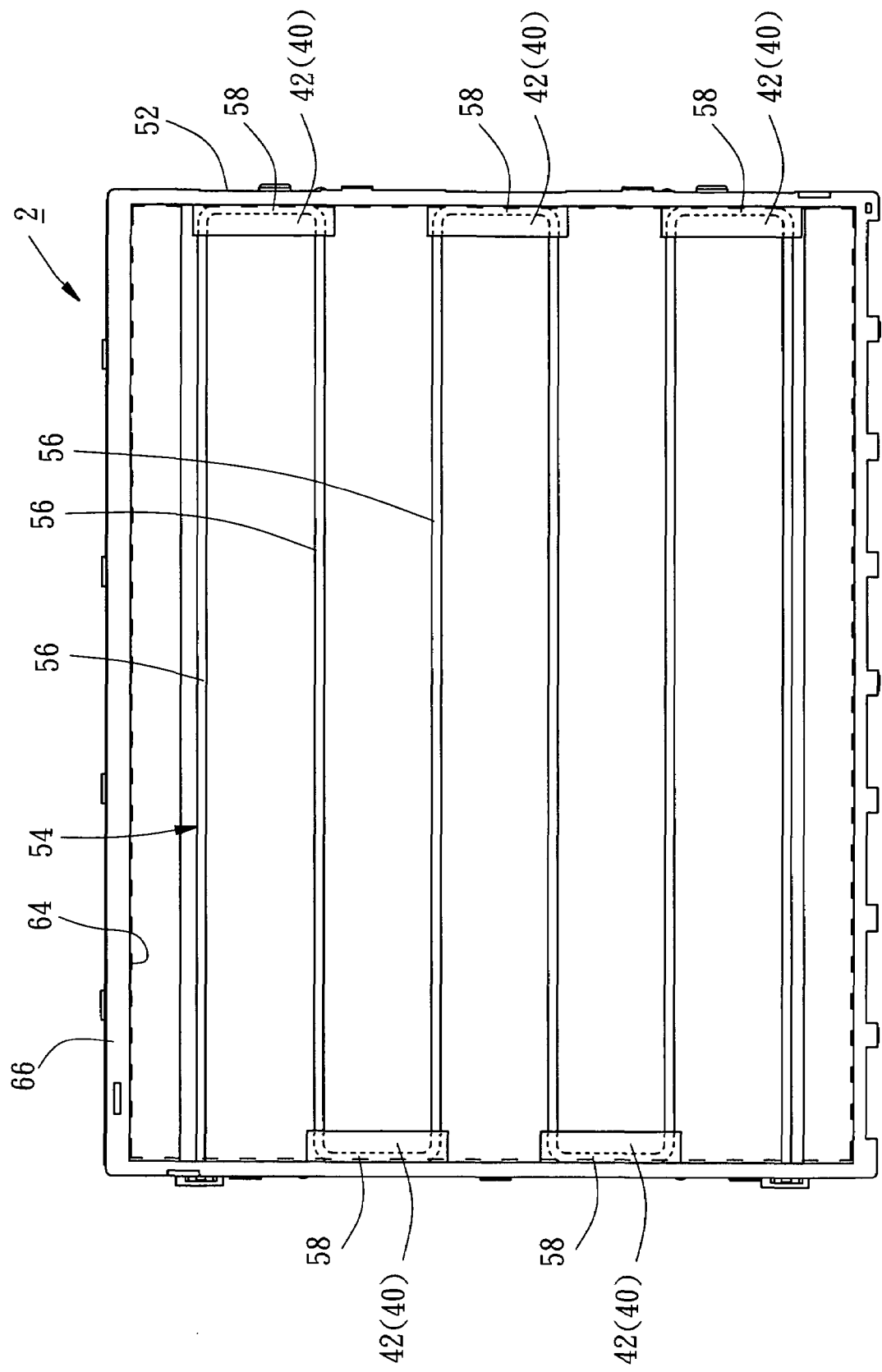
FIG. 6 is a top view of the second preferred embodiment of the present invention.

As shown in FIG. 5, the illuminating backlight unit 2 has a frame 52 on which a winding lamp 54 and five light shade devices 40 are mounted. The winding lamp 54 is made from a straight lamped bent a number of times so that it has six straight portions 56 and five connection portion 58 connected with the ends of neighboring straight portions 56. As shown in FIG. 7, the neighboring straight portions 56 are inserted into the holes 46 of the front masks 44 of the light shade devices 40 respectively via the gaps 48 respectively. The front mask 44 is moved to where adjacent to the connection portion 58 to extend the top mask 42 over the connection portion 58. The connectors 50 of the light shade devices 40 are inserted into slots 62 on a bottom plate 60 of the frame 52.

The top masks 42 and the front masks 44 of the light shade devices 40 have specific transparencies. The transparency of the top mask 42 is equal to or not equal to the transparency of the front mask 44. The top masks 42 shade a part of the light of the connection portions 58 directly emitting to a diffuser plate (not shown) and the front masks 44 shade a part of the light of the connection portions 58 emitting to the straight portions 56. The illuminating backlight unit 2 of the second preferred embodiment of the present invention also provides the straight portions 56 and the connection portions 58 of the lamp 54 in a window region 64 of the frame 52. As same as the illuminating backlight unit 1 of the second preferred embodiment, the illuminating backlight unit 2 of the second preferred embodiment still has a greater window region 64 and a smaller margin region 66.

Figure 8:
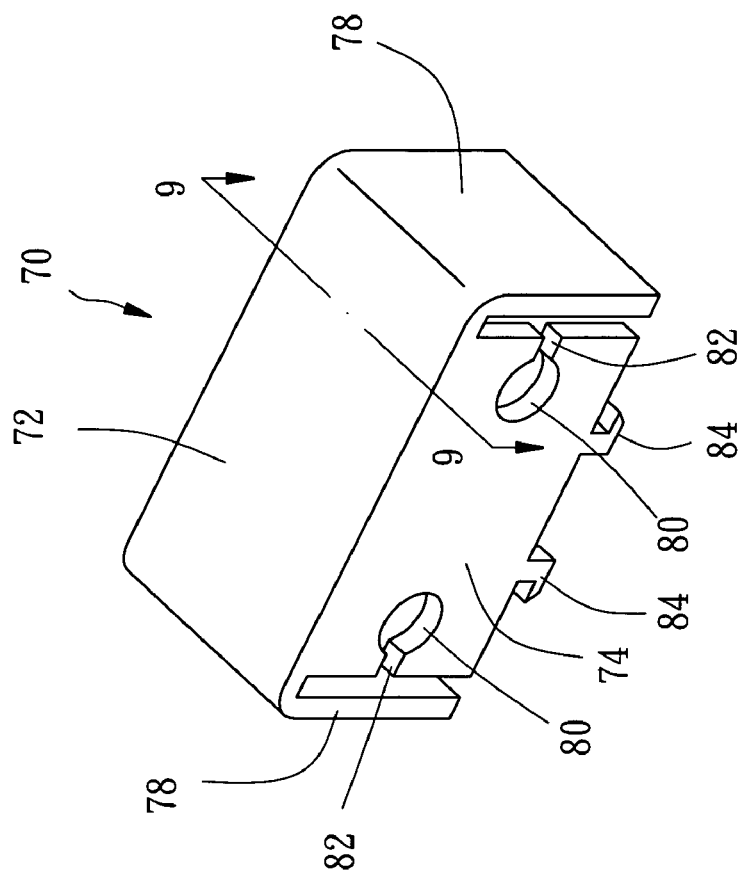
FIG. 8 is a perspective view of the light shade device of a third preferred embodiment of the present invention.

FIG. 8 shows a light shade device 70 of the third preferred embodiment of the present invention, which has a top mask 72, at four edges of which are a front mask 74, a rear mask 76 and two lateral masks 78. The front mask 74 has two holes 80, two gaps 82 extended from an end of the front mask 74 to the holes 80 respectively and two connectors 84 at a bottom of the front mask 74.

Figure 9:
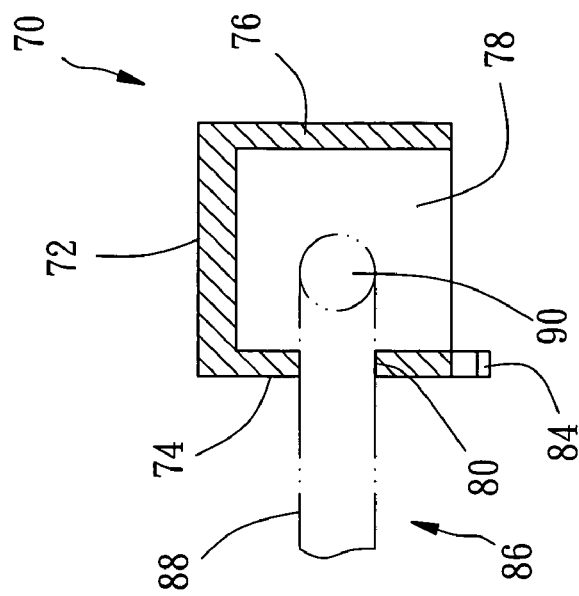
FIG. 9 is a sectional view of the light shade device and the lamp of the third preferred embodiment of the present invention.

As shown in FIG. 9, the light shade device 70 shades a connection portion 90 of a lamp 86, wherein straight portions 88 of the lamp 86 inserted into the holes 80 via the gaps 82 respectively. The connection portion 90 of the lamp 86 is arranged in between the top mask 72, the front mask 74, the rear mask 76 and the lateral masks 78. The top mask 72 shades a part of the light provided from the connection portion 90 emitting to a diffuser plate (not shown) directly, the front mask 74 is arranged between the straight portion 88 and the connection portion 90 to shade a part of the light of the connection portion 90 emitting to the straight portion 88, the rear mask 76 is extended at a rear of the connection portion 90 and the lateral masks are extended in between the neighboring connection portions 90 respectively. The light shade device 70 of the third preferred embodiment provides a full shade to the connection portion 90 of the lamp 86 and the masks 72, 74, 76 and 78 have specific transparencies to provide a suitable shade of the connection portion 90.

What is claimed is:

1. A illuminating unit of a LCD module, comprising:
   a frame having a window region and a margin region;
   at least a lamp having at least two straight portions and at least a connection portion connected to ends of the straight portions, wherein the lamp is mounted on the frame with the straight portions and the connection portion arranged in the window region, and
   at least a light shade device having a top mask extending over the connection portion of the lamp without extending over the entire at least two straight portions, wherein the top mask has a predetermined transparency to shade at least a part of a light provided from the connection portion of the lamp.

2. The illuminating unit as defined in claim 1, wherein the light shade device has a front mask to be extended between the connection portion and the straight portion of the lamp and the front mask has a predetermined transparency to shade at least a part of the light provided from the connection portion of the lamp.

3. The illuminating unit as defined in claim 2, wherein the front mask has two holes, in which the straight portions of the lamp are inserted.

4. The illuminating unit as defined in claim 3, wherein the front mask further has two gaps extended to the holes respectively.

5. The illuminating unit as defined in claim 2, wherein the light shade device further has a rear mask to be extended behind the connection portion, which has a predetermined transparency to shade at least a part of the light provided from the connection portion of the lamp.

6. The illuminating unit as defined in claim 2, wherein the light shade device further has a lateral mask to be extended beside the connection portion, which has a predetermined transparency to shade at least a part of the light provided from the connection portion of the lamp.

7. The illuminating unit as defined in claim 1, wherein the light shade device further has a rear mask to be extended behind the connection portion, which has a predetermined transparency to shade at least a part of the light provided from the connection portion of the lamp.

8. The illuminating unit as defined in claim 1, wherein the light shade device further has a lateral mask to be extended beside the connection portion, which has a predetermined transparency to shade at least a part of the light provided from the connection portion of the lamp.

9. The illuminating unit as defined in claim 1, wherein the light shade device has at least a connector to be inserted into a slot on a sidewall of the frame.

10. The illuminating unit as defined in claim 1, wherein the light shade device has at least a connector to be inserted into a slot on a bottom plate of the frame.

11. The illuminating unit as defined in claim 1, wherein the top mask has an inner top surface facing the connection portion, the inner top surface is substantially flat.

12. A illuminating unit of a LCD module, comprising:
   a frame having a window region and a margin region;
   at least a lamp having at least two straight portions and at least a connection portion connected to ends of the straight portions, wherein the lamp is mounted on the frame with the straight portions and the connection portion arranged in the window region, and
   at least a light shade device having a top mask extended over the connection portion of the lamp, wherein the top mask has a predetermined transparency to shade at least a part of a light provided from the connection portion of the lamp;

wherein the light shade device further has a rear mask to be extended behind the connection portion, which has a predetermined transparency to shade at least a part of the light provided from the connection portion of the lamp.

13. A illuminating unit of a LCD module, comprising:

a frame having a window region and a margin region;

at least a lamp having at least two straight portions and at least a connection portion connected to ends of the straight portions, wherein the lamp is mounted on the frame with the straight portions and the connection portion arranged in the window region, and at least a light shade device having a top mask extended over the connection portion of the lamp, wherein the top mask has a predetermined transparency to shade at least a part of a light provided from the connection portion of the lamp;

wherein the light shade device has at least a connector to be inserted into a slot on a sidewall of the frame.

* * * * *